US009298453B2

(12) United States Patent
Vangala et al.

(10) Patent No.: US 9,298,453 B2
(45) Date of Patent: Mar. 29, 2016

(54) SOURCE CODE ANALYTICS PLATFORM USING PROGRAM ANALYSIS AND INFORMATION RETRIEVAL

(75) Inventors: Vipindeep Vangala, Hyderabad (IN); Pankaj Madhukar, Secunderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 13/540,616

(22) Filed: Jul. 3, 2012

(65) Prior Publication Data

US 2014/0013304 A1 Jan. 9, 2014

(51) Int. Cl.
*G06F 9/44* (2006.01)
(52) U.S. Cl.
CPC ........................ *G06F 8/75* (2013.01)
(58) Field of Classification Search
CPC ............... G06F 8/71; G06F 8/74–8/75; G06F 17/30958; G06F 17/30991
USPC .................................................. 717/120–121
See application file for complete search history.

(56) References Cited

U.S. PATENT DOCUMENTS

| | | | |
|---|---|---|---|
| 7,174,536 B1 * | 2/2007 | Kothari et al. ................. | 717/109 |
| 7,730,451 B2 * | 6/2010 | Styles ................. | G06F 11/3624 717/115 |
| 2007/0011649 A1 * | 1/2007 | Venolia .......................... | 717/101 |
| 2007/0112748 A1 | 5/2007 | Angell et al. | |
| 2009/0222429 A1 * | 9/2009 | Aizenbud-Reshef et al. .... | 707/5 |
| 2010/0211924 A1 * | 8/2010 | Begel ......................... | G06F 8/74 717/101 |
| 2011/0040808 A1 | 2/2011 | Joy et al. | |
| 2012/0110557 A1 * | 5/2012 | Singh et al. ................... | 717/133 |
| 2013/0086556 A1 * | 4/2013 | Grechanik .................... | 717/126 |

OTHER PUBLICATIONS

Wu, et al., "Coping with Legacy System Migration Complexity", Retrieved at <<http://ieeexplore.ieee.org/stamp/stamp.jsp?tp=&arnumber=1467942>>, 10th IEEE International Conference on Engineering of Complex Systems (ICECCS), Retrieved Date: Jun. 16-20, 2005, pp. 600-609.
Deursen, et al., "Building Documentation Generators", Retrieved at <<http://ieeexplore.ieee.org/stamp/stamp.jsp?tp=&arnumber=792497>>, IEEE International Conference on Software Maintenance, (ICSM), Aug. 30, 1999, pp. 40-49.

(Continued)

*Primary Examiner* — Duy Khuong Nguyen
(74) *Attorney, Agent, or Firm* — Timothy Churna; Judy Yee; Micky Minhas (57) ABSTRACT

In one embodiment, a code analytic platform may use a novel combination of information retrieval and program analysis techniques to develop a code relationship graph 514 to perform various code applications, such as intent based searches on a source code set, the documentation of undocumented code, risk analyses, natural language semantic searches, and others. A source code analytics platform may perform a code analysis of a source code set 410. The source code analytics platform may perform a metadata analysis of a code production data set 430 associated with the source code set 410. The source code analytics platform may create a code relationship graph 514 associating the source code set 410 with a descriptive metadata set.

20 Claims, 10 Drawing Sheets

(56) References Cited

OTHER PUBLICATIONS

Burrows, et al., "Application of Information Retrieval Techniques for Source Code Authorship Attribution", Retrieved at <<http://www.seg.rmit.edu.au/research/download.php?manuscript=238>>, 14th International Conference on Database Systems for Advanced Applications (DASFAA), Apr. 21-23, 2009, pp. 699-713.

Marcus, et al., "Software is Data Too", Retrieved at <<http://menzies.us/pdf/10softwareisdata.pdf>>, Proceedings of the FSE/SDP Workshop on Future of Software Engineering Research (FoSER), Nov. 7-6, 2010, pp. 4.

Lucia, et al., "Recovering Traceability Links in Software Artefact Management Systems using Information Retrieval Methods", Retrieved at <<http://www.sesa.dmi.unisa.it/TOSEM_06.pdf>>, ACM Transactions on Software Engineering and Methodology (TOSEM), Sep. 2007, pp. 58.

Marcus, et al., "Recovery of Traceability Links Between Software Documentation and Source Code", Retrieved at <<http://www.cs.kent.edu/~jmaletic/papers/IJSEKE05.pdf>>, International Journal of Software Engineering and Knowledge Engineering (IJSEKE), vol. 15, Issue 5, Oct. 2005, pp. 811-636.

Poshyvanyk, et al., "Feature Location using Probabilistic Ranking of Methods based on Execution Scenarios and Information Retrieval", Retreived at <<http://www-etud.iro.umontreal.ca/~ptidej/yanngael/Work/Publications/Documents/TSE07.doc.pdf>>, IEEE Transactions on Software Engineering, Jun. 2007, pp. 420-432.

\* cited by examiner

SOURCE CODE ANALYTICS PLATFORM USING PROGRAM ANALYSIS AND INFORMATION RETRIEVAL

BACKGROUND

Creating a software application may involve multiple people writing multiple segments of software source code, as well as documents tracking those segments. Each segment of software code may have a different purpose known to just the person that wrote the software code. With multiple people writing the code, drafting design documents, and fixing code errors, communicating the functionality of each segment of code may become difficult. Further, as the code increases in complexity, even the writers of the code may have difficulty tracking what each line of code does.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to using a novel combination of information retrieval and program analysis techniques to develop a code relationship graph to perform various code applications, such as intent based searches on a source code set, the documentation of undocumented code, risk analyses, natural language semantic searches, and others. A source code analytics platform may perform a code analysis of a source code set. The source code analytics platform may perform a metadata analysis of a code production data set associated with the source code set. The source code analytics platform may create a code relationship graph associating the source code set with a descriptive metadata set.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible computer-readable medium having a set of instructions detailing a method stored thereon for at least one processor, or a source code analytics platform.

Searching source code may be difficult if the product code is not well understood, especially using a high level description or fat query. Further, documentation for legacy code may be non-existent or sparse.

A source code analytics platform may use data from throughout the code production network to produce a code relationship graph that accurately describes segments of the source code in varying degrees of granularity. The code production network represents the data sources involved in the creation of a software application or operating system. In addition to the source code that is compiled to create the software application or operating system, the code production network may include data describing the source code creation process, referred to herein as a code production data set. The code production data set may have test code, bug records, concurrent version systems, design documents, product documents, and other infrastructure data describing the code creation process or the functionality of the compiled code. A source code analytics platform may use a novel combination of information retrieval and program analysis techniques to learn the "artifacts" from the source code set and the code production data set, linking them to available or automatically created documentation. The code analytic platform may create a code relationship graph by overlaying a fuzzy descriptor over existing source code by automated learning and linking of these diverse information sources.

A user may implement this holistic representation of the source code in a variety of data mining functions in the source code. The code relationship graph may help in creating a platform supporting diverse code related applications, such as documenting existing code, searching code based on domain specific terms closer to natural language, and risk analysis. For the non-documented code, the code relationship graph may act as documentation reference and help in creating a framework of code related applications. For example, the source code analytics platform may help the user by capturing the intent of the search, showing relevant results that match the query and intent of the code search by exploring the code relationship graph.

Thus, in one embodiment, a code analytic platform may use a novel combination of information retrieval and program analysis techniques to develop a code relationship graph to perform various code applications, such as intent based searches on a source code set, the documentation of undocumented code, risk analyses, natural language semantic searches, and others. A source code analytics platform may perform a code analysis of a source code set. The code analysis searches the source code set for descriptive data. The source code analytics platform may perform a metadata analysis of a code production data set associated with the source code set. The metadata analysis of the code production data set searches the code production data set for metadata describing the source code. The source code analytics platform may create a code relationship graph associating the source code set and related information with a descriptive metadata set using information retrieval and program analysis.

Figure 1:
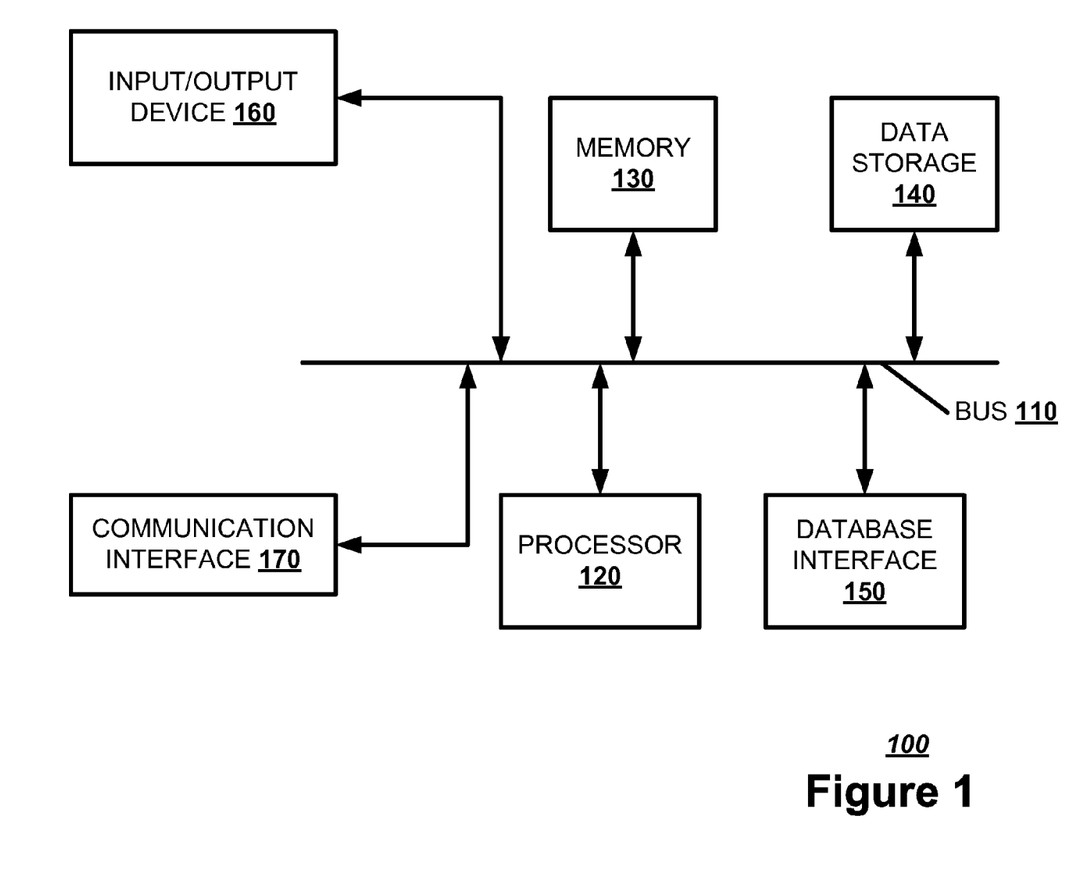
FIG. 1 illustrates, in a block diagram, one embodiment of a computing device.

FIG. 1 illustrates a block diagram of an exemplary computing device 100 which may act as a source code analytics platform. The computing device 100 may combine one or more of hardware, software, firmware, and system-on-a-chip technology to implement a source code analytics platform. The computing device 100 may include a bus 110, a processor 120, a memory 130, a data storage 140, a database interface 150, an input/output device 160, and a communication interface 170. The bus 110 may permit communication among the components of the computing device 100.

The processor 120 may include at least one conventional processor or microprocessor that interprets and executes a set of instructions. The memory 130 may be a random access memory (RAM) or another type of dynamic data storage that stores information and instructions for execution by the processor 120. The memory 130 may also store temporary variables or other intermediate information used during execution of instructions by the processor 120. The data storage 140 may include a conventional read only memory (ROM) device or another type of static data storage that stores static information and instructions for the processor 120. The data storage 140 may include any type of tangible computer-readable medium, such as, for example, magnetic or optical recording media, such as a digital video disk, and its corresponding drive. A tangible computer-readable medium is a physical medium storing machine-readable code or instructions, as opposed to a signal. Having instructions stored on a computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The database interface 150 may access a source code database, a document depository, and a bug depository, and other databases.

The input/output device 160 may include one or more conventional mechanisms that permit a user to input information to the computing device 100, such as a keyboard, a mouse, a voice recognition device, a microphone, a headset, a gesture recognition device, a touch screen, etc. The input/output device 160 may include one or more conventional mechanisms that output information to the user, including a display, a printer, one or more speakers, a headset, or a medium, such as a memory, or a magnetic or optical disk and a corresponding disk drive. The communication interface 170 may include any transceiver-like mechanism that enables computing device 100 to communicate with other devices or networks. The communication interface 170 may include a network interface or a transceiver interface. The communication interface 170 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 170.

Figure 2:
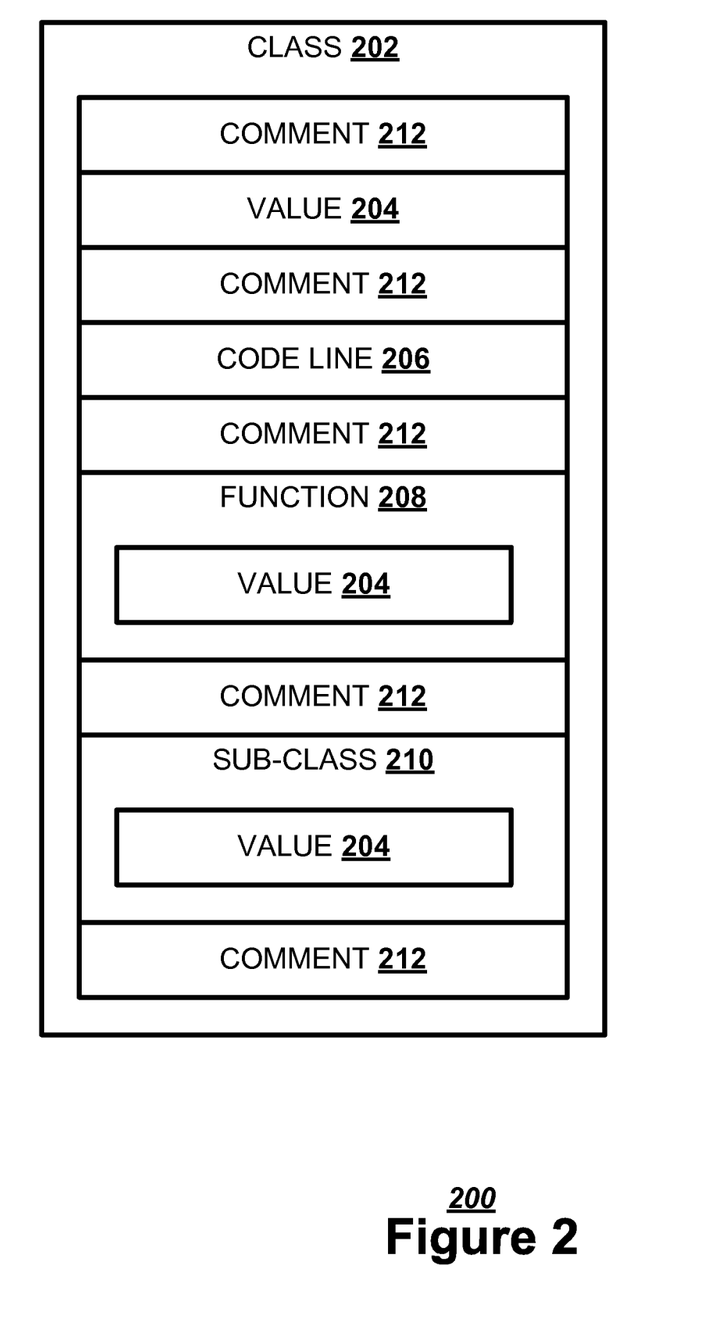
FIG. 2 illustrates, in a block diagram, one embodiment of a source code subset.

A source code set may be divided into a source code subset of a variable code subset granularity, or size. FIG. 2 illustrates, in a block diagram, one embodiment of a source code subset 200. Briefly, the source code subset may be a class object 202, or a construct that creates instances of itself. A class object 202 may have value objects 204, code lines 206, functions 208, sub-class objects 210, and other data. A value object 204 may be a constant or a variable that may be passed to other functions or classes. The class object 202 may receive the value object 204 from the application that activated the class object 202, self generate the value object 204, or return the value object 204 to the activating application. The code line 206 may describe an operation performed on a value 204, execute a branching instruction, or describe a loop. A function 208 is a subroutine that may perform a series of operations on a value 204 passed to the function 208. A sub-class object 210 is a class object called by the original class object 202. In an object oriented programming language, the code subset granularity may set to various object levels, sub object levels, and functions 208. Each object, sub-object, code line 206, or function 208 may be described by a comment 212. A comment 212 is an inline description written into a piece of code to describe the functions of that code that does not affect the performance of that code.

Different parts of a source code set may link to each other in a specific context, such as control flow, data flow, call pattern, and other connections. Control flow defines a sequence of execution of the source code set. Data flow tracks the manipulation and flow of the data and corresponding data dependencies across the source code set. Call pattern and call graphs track the interaction between different functions, classes, and modules in the source code set. When a user searches for a specific query with intent to change a function, an intent based search result may give an exact function along with other related information that closely relates to that function and may be more relevant than the exact function.

Figure 3:
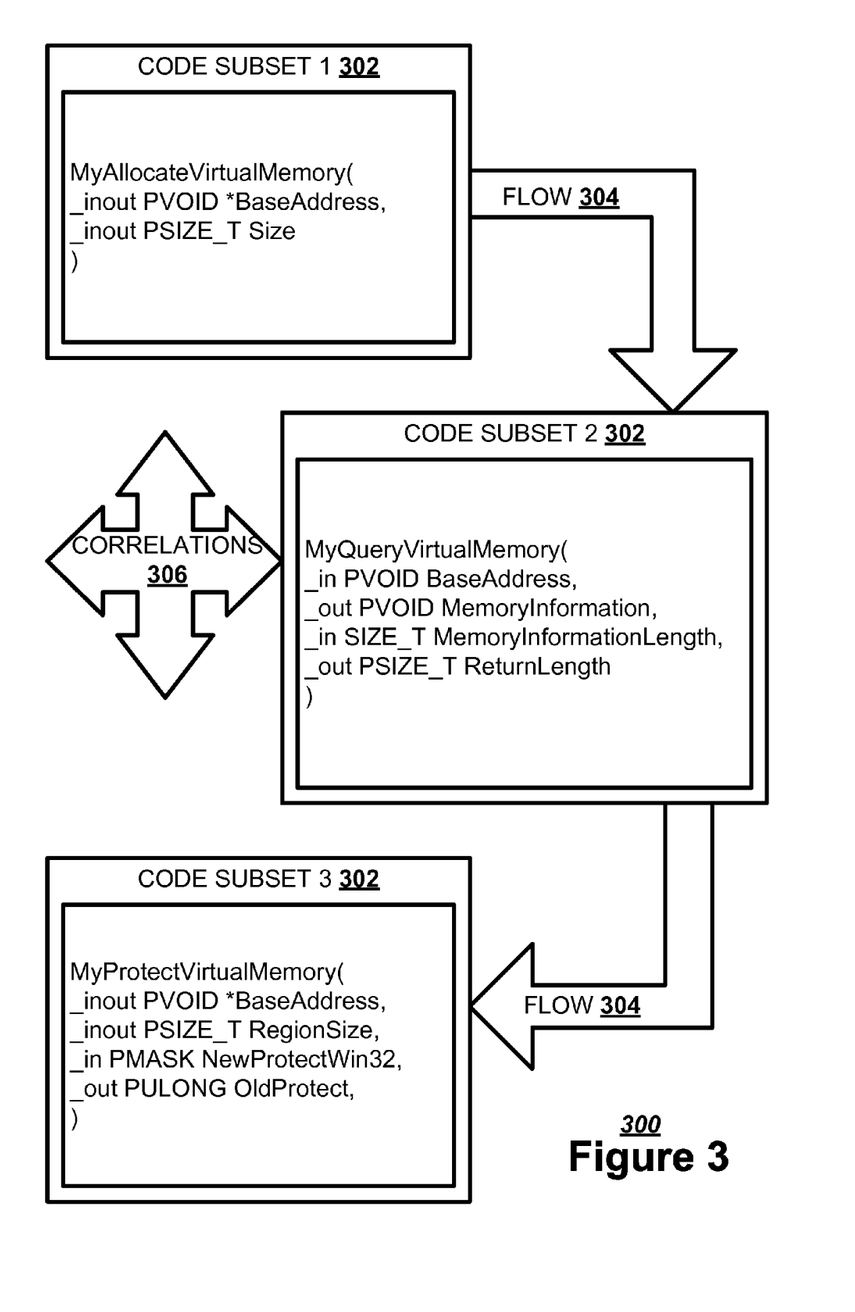
FIG. 3 illustrates, in a block diagram, one embodiment of a code relationship.

FIG. 3 illustrates, in a block diagram, one embodiment of a code relationship 300. A first source code subset 302 may flow 304 into a second source code subset 302, which may flow 304 into a third source code subset 302. This control flow and data flow may create correlations 306 between the three source code subsets 302.

For example, a user may wants to change a "RegionSize" object of a memory manager object. The intent of the user may be to increase the size of memory allocation units. A typical string based query "RegionSize increase" in any typical source code search tool may return hundreds of results containing the query word "regionsize" which may not be properly ranked, leaving the user unsatisfied. The user may determine, from the hundreds of results that source code subset 3 302, the function MyProtectVirtualMemory contains the parameter RegionSize. However, source code subset 2 302, the function MyQueryVirtualMemory, may call this parameter. Further, MyQueryVirtualMemory may in turn be called by the call "Size" by source code subset 1, the function MyAllocateVirtualMemory. Thus, 'MyAllocateVirtualMemory' may have the checks corresponding to region size limits, but without any direct reference to RegionSize. Any string based search may not spot the connection, as the relations and links are overlooked.

A code relationship graph may consider more than the occurrence of a text string by addressing other parameters. A code relationship graph may approach a source code set like an internet page, with each node representing a specific building block, such as function 208, block of code, class 202, file, types, and other parameters.

Two pieces of code, such as functions 208, may be related to each other by control flow, data flow relation, code clones, operating on similar data structures, using similar data types or values, working on the same specification, and other connections. The code relationship graph may consider a code fragment as a node, linking the nodes to one another in a way that illustrates these connections. Any search on a code may capture these relations to predict and understand the intent of search.

To generate a code relationship graph, a source code analytics platform may identify by static analysis and information retrieval techniques data describing the implicit and explicit relationships between the nodes in a graph. An information retrieval technique may be cluster analysis, term frequency-inverse document frequency weighting, or other document data mining tactics. Cluster analysis involves grouping an object set so that objects in the same cluster are more similar to each other than objects in other clusters. Term frequency-inverse document frequency (TF-IDF) weighting scores documents by offsetting the value of a term frequency in a document with a term frequency overall. The code relationship graph may characterize each node by specific attributes called "artifacts". These artifacts are descriptors or representative elements of the node. Artifacts may be keywords, variable names, comments, control flow edges, data flow relations, type inferences, analysis of code as text, and other descriptors.

Figure 4:
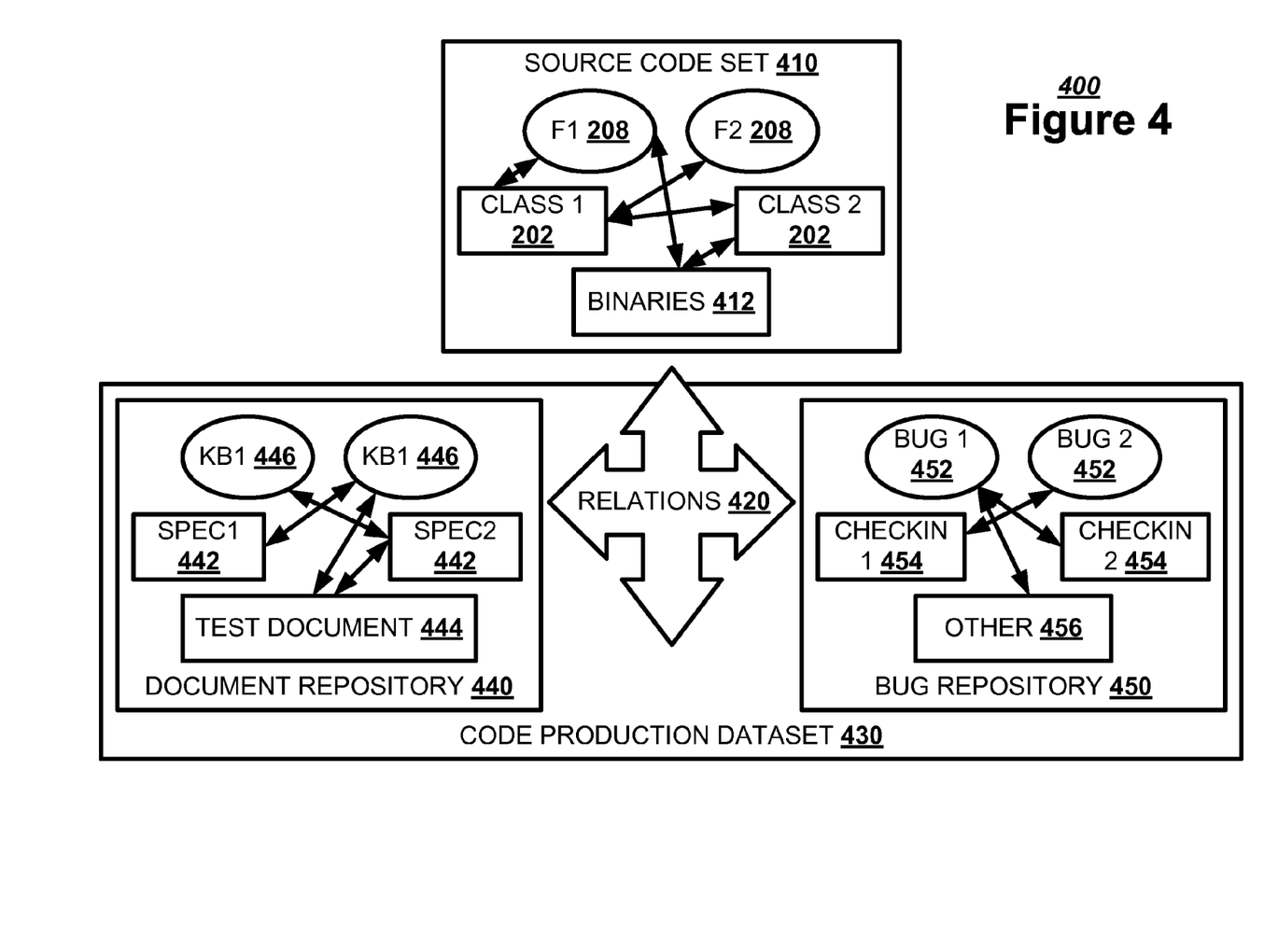
FIG. 4 illustrates, in a block diagram, one embodiment of a code production network.

A source code analytics platform may further utilize the existing code production network to create a code relationship graph that properly describes each source code subset. FIG. 4 illustrates, in a block diagram, one embodiment of a code production network 400. A source code set 410 may have a number of relationships 420 with various members of a code production data set 430. The source code set 410 may contain the original source code detailing class objects 202 and functions 208, as well as the binaries 412 that result from compiling the original source code. The code production data set 430 is various collections of metadata that describe portions of the code generation process.

For example, the code production data set 430 may have a design document repository 440, containing interconnecting documents that detail the planning of stages of the code generating process. The design document repository 440 may describe design specifications 442, test documents 444, knowledge bases (KB) 446, product description documents, and other documents related to the source code set 410. The design specification 442 describes the functionality of a source code set 410. The test document 444 describes testing strategies and results on a source code set 410. A knowledge base 446 is a database managing information about the source code set 410.

In another example, the code production data set 430 may have a bug repository 450, containing documentation of any "bugs", or computer errors, associated with the source code set. The bug repository 450 may have bug descriptors 452, code check-ins 454, and other bug data 456. A bug descriptor 452 describes a bug found in the source code set 410. A code check-in 454 describes a fix applied to correct a bug.

Figure 5:
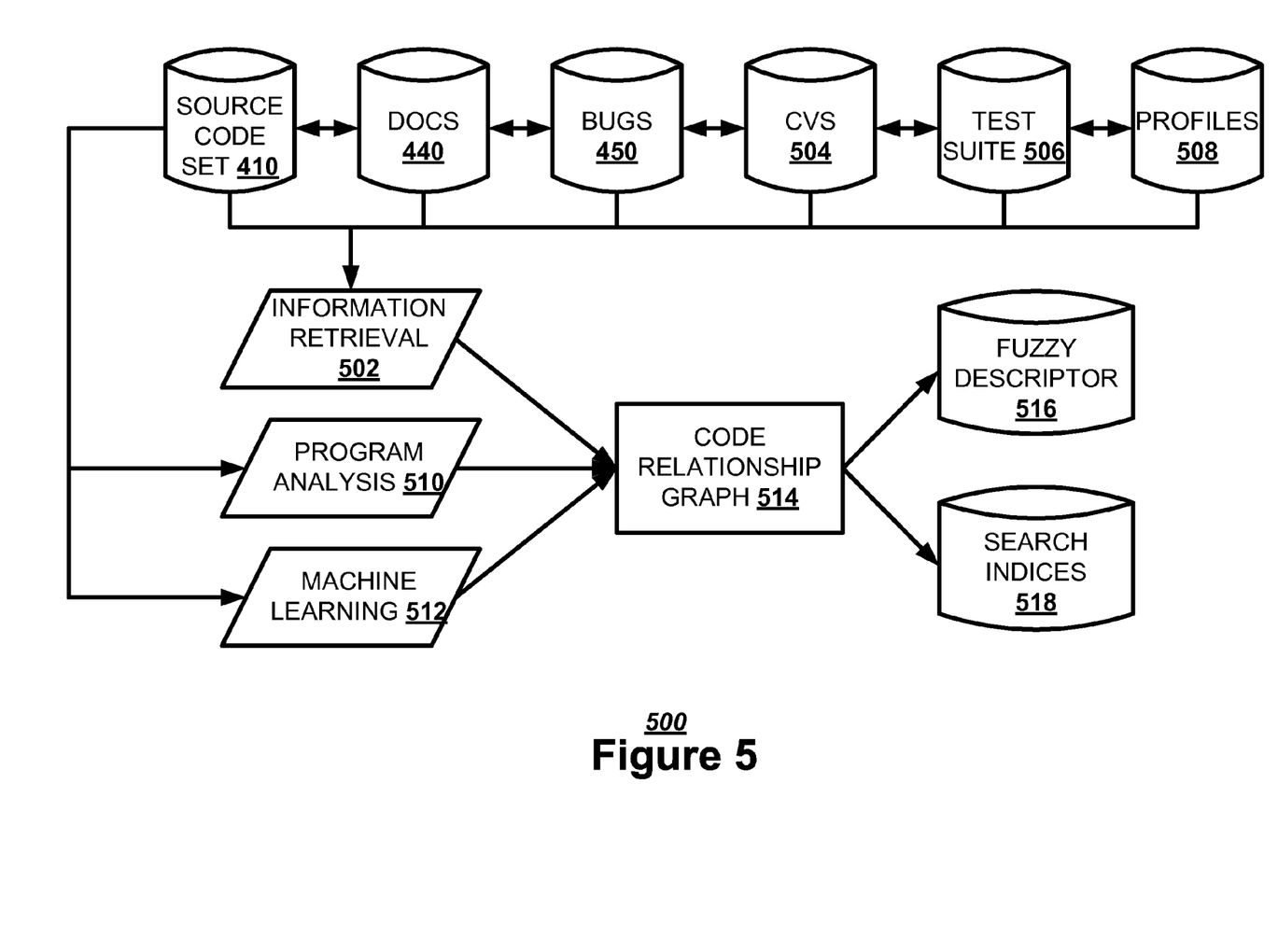
FIG. 5 illustrates, in a block diagram, one embodiment of a code relationship graph generation aspect of a source code analytics platform.

FIG. 5 illustrates, in a block diagram, one embodiment of a code relationship graph generation aspect 500 of a source code analytics platform. The source code analytics platform may mine metadata information from existing data sources and apply different analysis techniques to create artifacts to be associated with each node of a code relationship graph. The source code analytics platform may apply an information retrieval module 502 to various data repositories to retrieve possible artifacts. The data repositories may include the source code set 410, the design document repository 440, the bug depository 450, the concurrent version system (CVS) 504, the test suite 506, and the runtime profiles 508. The concurrent version system 504 is a revision control system that tracks development. The test suite 506 is a collection of conditions and variables used to validate a software application. A runtime profile 508 is an analysis of a software application during execution. The source code analytics platform may execute a program analysis module 510 to refine the node artifacts and a machine learning module 512 to correlate the node artifacts. The information retrieval module 502, the program analysis module 510, and the machine learning module 512 may feed this data into a code relationship graph 514. The code relationship graph 514 may use this data to connect a fuzzy descriptor 516 of the source code set 410, or a generated description of a code subset, to search indices 518 based on the node artifacts.

The source code analytics platform may use an information retrieval module 502 combined with a program analysis module 510 and a machine learning module 512 to build and mine the code relationship graph 514 with associated artifacts and link them to available or automatically created documentation. For example, the source code analytics platform may learn a function 'CheckForUserStackOverflow' by simple lexical analysis. In most cases, a developer may follow basic guidelines of coding by having meaningful function, variable, class and file names. Additionally, a function 208 may have a prologue describing the function 208 in natural language. Using this, the source code analytics platform may extract artifacts from the source code set 410 as is done for general natural language, text classification techniques. For example userName, userPassword, userDomain may be used as variables in a function named as accountCredentialsQ. The source code analytics platform may collect these artifacts with occurrences in a specific class, file, directory, or other data location. The source code analytics platform may extract the information and automatically filter out the most common artifacts, such as "if" or "else", by using information retrieval techniques to rank artifacts of specific node. The information retrieval technique may be term frequency and inverse document frequency. For example, the artifact REGIONSIZE may be top ranked for the function being analyzed and for others that follow.

Apart from a simple lexical analysis, the source code analytics platform may use other static analysis techniques on the source code set 410, such as a control flow analysis, a data flow analysis, or other program analyses. The source code analytics platform may use these static analysis techniques to create relationships between artifacts and explain how any two nodes in the code relationship graph are correlated. Further, the source code analytics platform may detect other artifacts based on the design document repository 440, the bug repository 450, the concurrent version system, the test suite 506, and the runtime profiles 508.

Further, as the source code analytics platform associates descriptive metadata with a described code subset, the source code analytics platform may leverage that information to describe matching code subsets. The source code analytics platform may use control flow analysis, data flow analysis, and other program analyses, to identify a source code subset that matches a described code subset, referred to as a matching code subset. The source code analytics platform may then use the previously generated description to describe the matching code subset.

Figure 6:
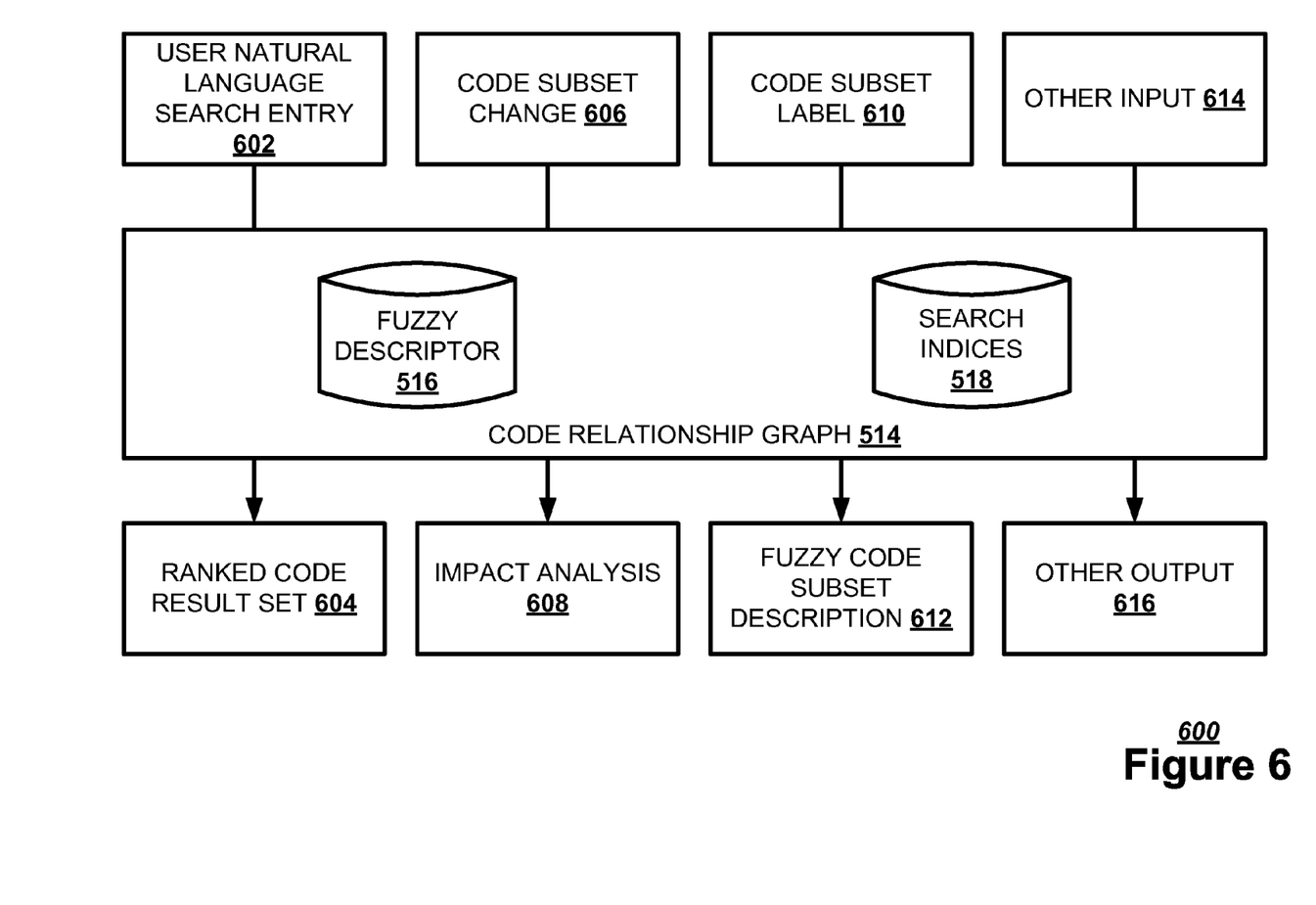
FIG. 6 illustrates, in a block diagram, one embodiment of a search engine aspect of a source code analytics platform.

FIG. 6 illustrates, in a block diagram, one embodiment of a search engine aspect 600 of a source code analytics platform. The source code analytics platform may have the code relationship graph 514 use the fuzzy descriptor 516 and the search indices 518 to process user queries in various specific scenarios. For example, the source code analytics platform may receive a user natural language search entry 602. A user natural language search entry 602 is a search query written without the user transforming the query into a given format. The source code analytics platform may later rewrite that user natural language search entry 602 into a more usable format. The source code analytics platform may determine the user intent based on the user natural language search entry 602. The source code analytics platform may then return a ranked code result set 604. The ranked code result set 604 is a list of source code subsets ranked according to the best result according to user intent.

In another example, the source code analytics platform may receive a code subset change 606 to a code subset of the source code set 410. A code subset change 606 is a change to a specified source code subset. The source code analytics platform may identify an impacted code subset of the source code set 410 based on the code subset change. The impacted code subset is another source code subset affected by the change to the specified source code subset. The source code analytics platform may then produce an impact analysis 608 of a code subset change. The impact analysis 608 describes changes to the impacted code subset.

In a further example, the source code analytics platform may receive a code subset label 610. A code subset label 610 is the name of a source code subset, such as a class name or a function name. The source code analytics platform may produce a fuzzy code subset description 612 describing the functionality of the source code subset identified by the code subset label 610. Additionally, the source code analytics platform may receive other source code set related inputs 614 to produce other source code set related outputs 616.

Figure 7:
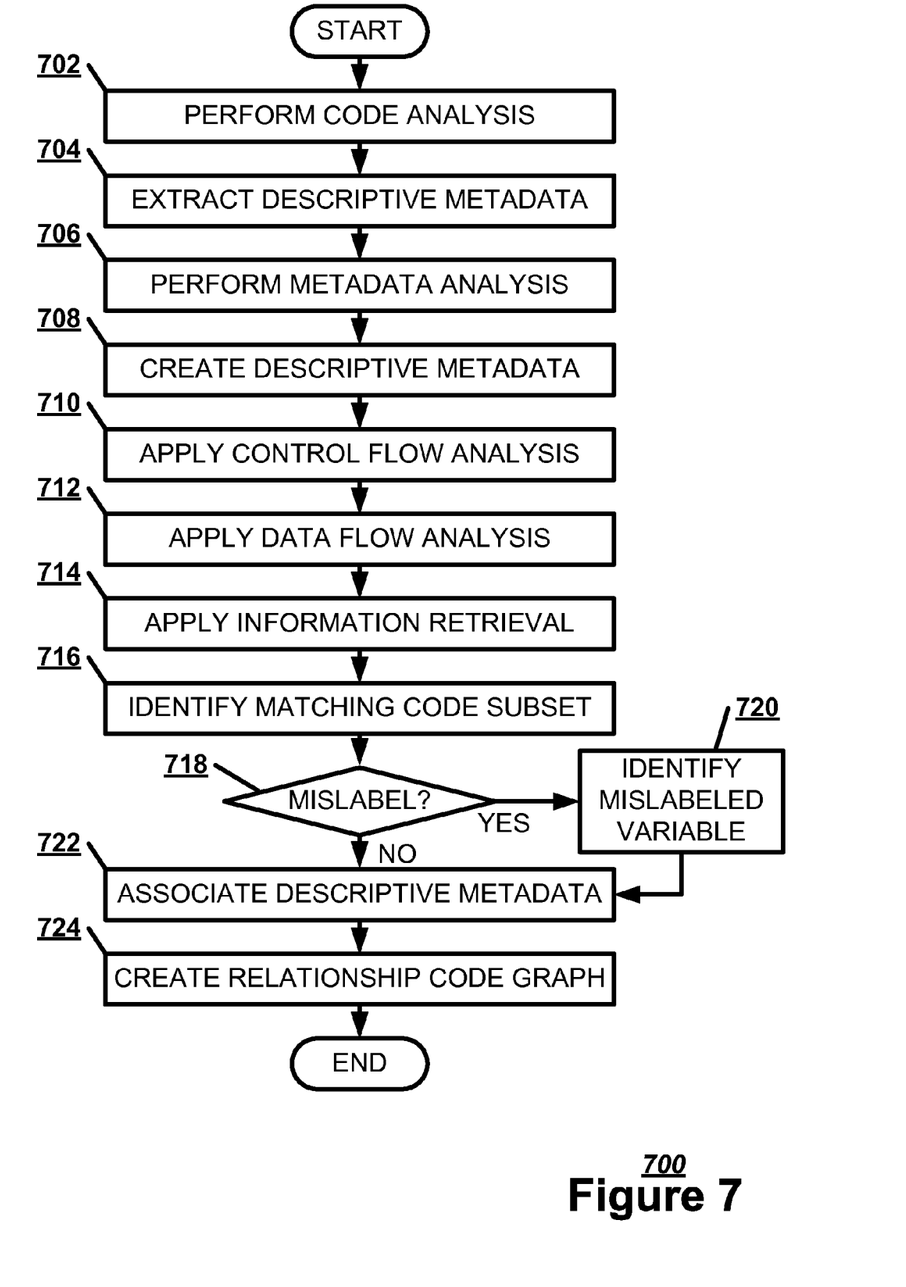
FIG. 7 illustrates, in a flowchart, one embodiment of a method for generating a code relationship graph.

FIG. 7 illustrates, in a flowchart, one embodiment of a method 700 for generating a code relationship graph 514. A source code analytics platform may perform a code analysis of a source code set 410 (Block 702). The source code analytics platform may extract a descriptive metadata subset from a described code subset (Block 704). The source code analytics platform may perform a metadata analysis of a code production data set 430 associated with the source code set 410 (Block 706). The source code analytics platform may create a descriptive metadata subset associated with the described code subset based on at least one of a product description document, a design document, and a bug report (Block 708).

The source code analytics platform may apply various program analyses to the source code set 410. The source code analytics platform may apply a control flow analysis to a described code subset (Block 710). The source code analytics platform may apply a data flow analysis to a described code subset (Block 712). The source code analytics platform may apply an information retrieval technique to a described code subset (Block 714).

The source code analytics platform may identify a matching code subset that matches the described code subset (Block 716). If one of the data variables in the matching code subset is mislabeled (Block 718), the source code analytics platform may identify the mislabeled data variable based on the data flow analysis (Block 720). The source code analytics platform may associate the matching code subset with a descriptive metadata subset describing the described code subset (Block 722). The source code analytics platform may create a code relationship graph 514 associating the source code set 410 with a descriptive metadata set based on at least one of a code analysis of the source code set and a metadata analysis of a code production data set (Block 724).

Figure 8:
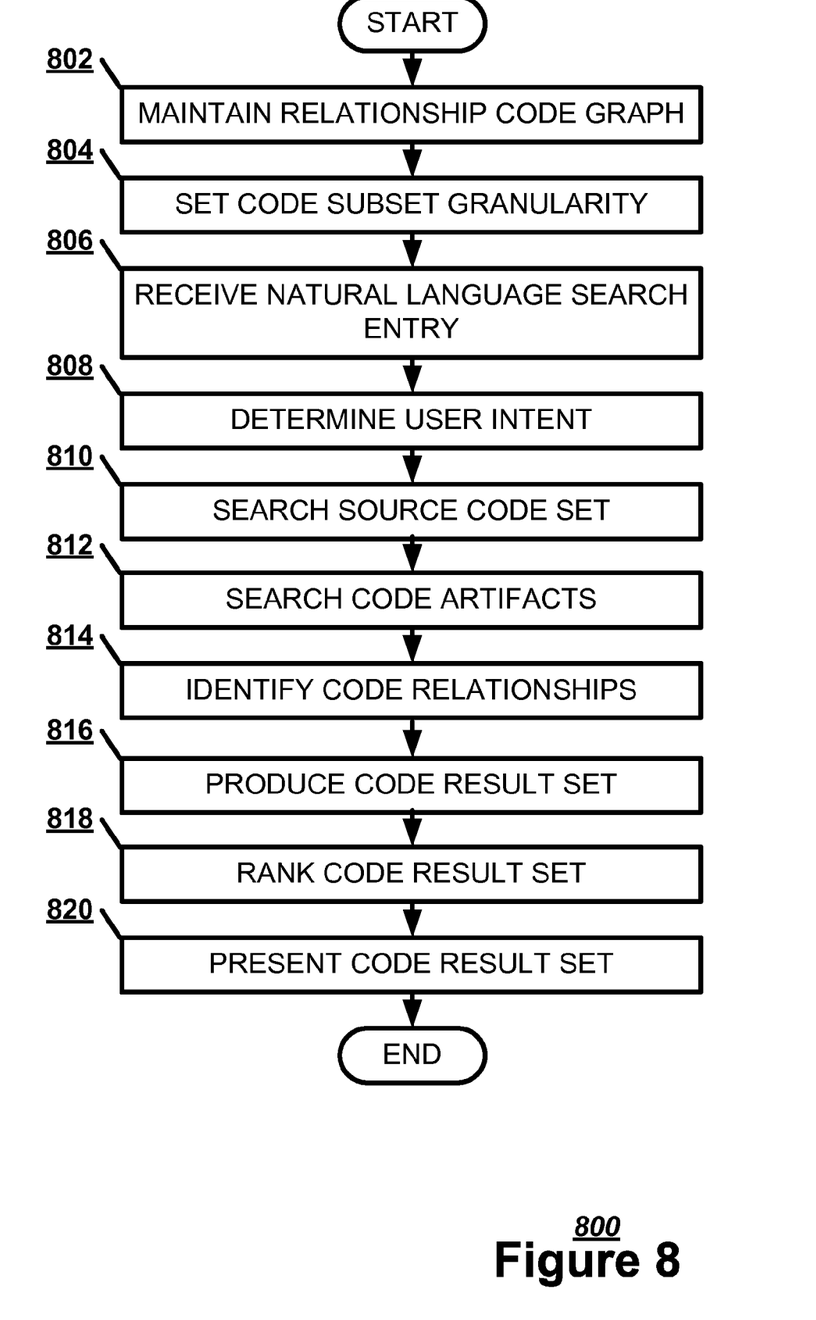
FIG. 8 illustrates, in a flowchart, one embodiment of a method for executing a natural language data code search.

FIG. 8 illustrates, in a flowchart, one embodiment of a method 800 for executing a natural language data code search. The source code analytics platform may maintain a code relationship graph associating a source code set 410 with a descriptive metadata set retrieved using at least one of information retrieval and program analysis (Block 802). The source code analytics platform may set a code subset granularity for a code subset search of the source code set 410 (Block 804). The source code analytics platform may receive a user natural language search entry 602 (Block 806). The source code analytics platform may determine a user intent based on the user natural language search entry (Block 808). The source code analytics platform may search the source code set for the user natural language search entry 602 based on the code relationship graph 514 (Block 810). The source code analytics platform may search a set of code artifacts associated with the source code set 410 based on the user natural language search entry 602 (Block 812). The source code analytics platform may map the artifact search results to code graph nodes of the code relationship graph 514 to identify code relationships that may capture the user intent (Block 814). The source code analytics platform may use the code relationships to produce a code result set (Block 816). The source code analytics platform may rank a code result set based on the code relationship graph (Block 818). The source code analytics platform may present a ranked code result set 604 (Block 820).

Figure 9:
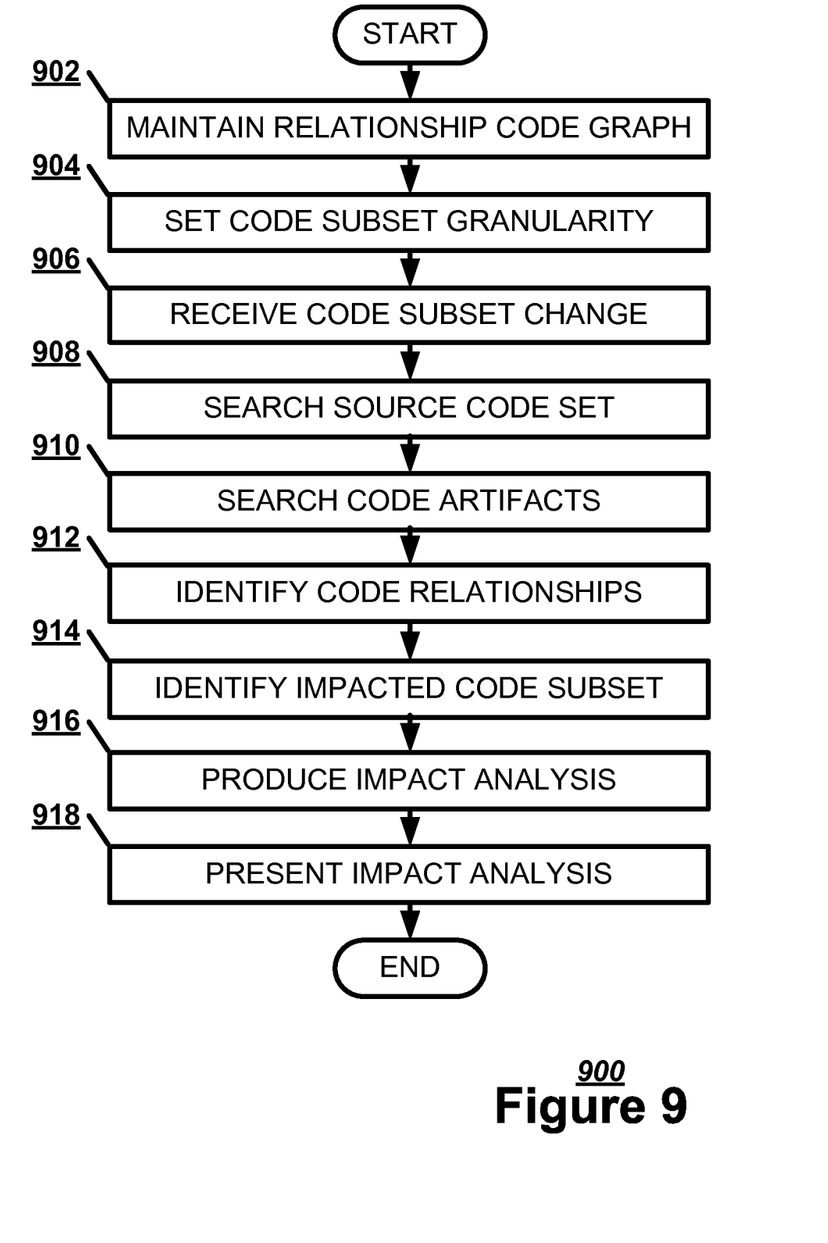
FIG. 9 illustrates, in a flowchart, one embodiment of a method for executing a data change impact analysis.

FIG. 9 illustrates, in a flowchart, one embodiment of a method 900 for executing a data change impact analysis. The source code analytics platform may maintain a code relationship graph associating a source code set 410 with a descriptive metadata set (Block 902). The source code analytics platform may set a code subset granularity for a code subset search of the source code set 410 (Block 904). The source code analytics platform may receive a code subset change 606 to a code subset of the source code set 410 (Block 906). The source code analytics platform may search the source code set for the code subset change 606 based on the code relationship graph 514 (Block 908). The source code analytics platform may search a set of code artifacts associated with the source code set 410 based on the code subset change 606 (Block 910). The source code analytics platform may map the artifact search results to code graph nodes of the code relationship graph 514 to identify code relationships that may identify impacted code subsets (Block 912). The source code analytics platform may identify an impacted code subset of the source code set 410 based on the code subset change 606 (Block 914). The source code analytics platform may produce an impact analysis 608 of the code subset change 606 (Block 916). The source code analytics platform may present the impact analysis 608 of the code subset change 606 (Block 918).

Figure 10:
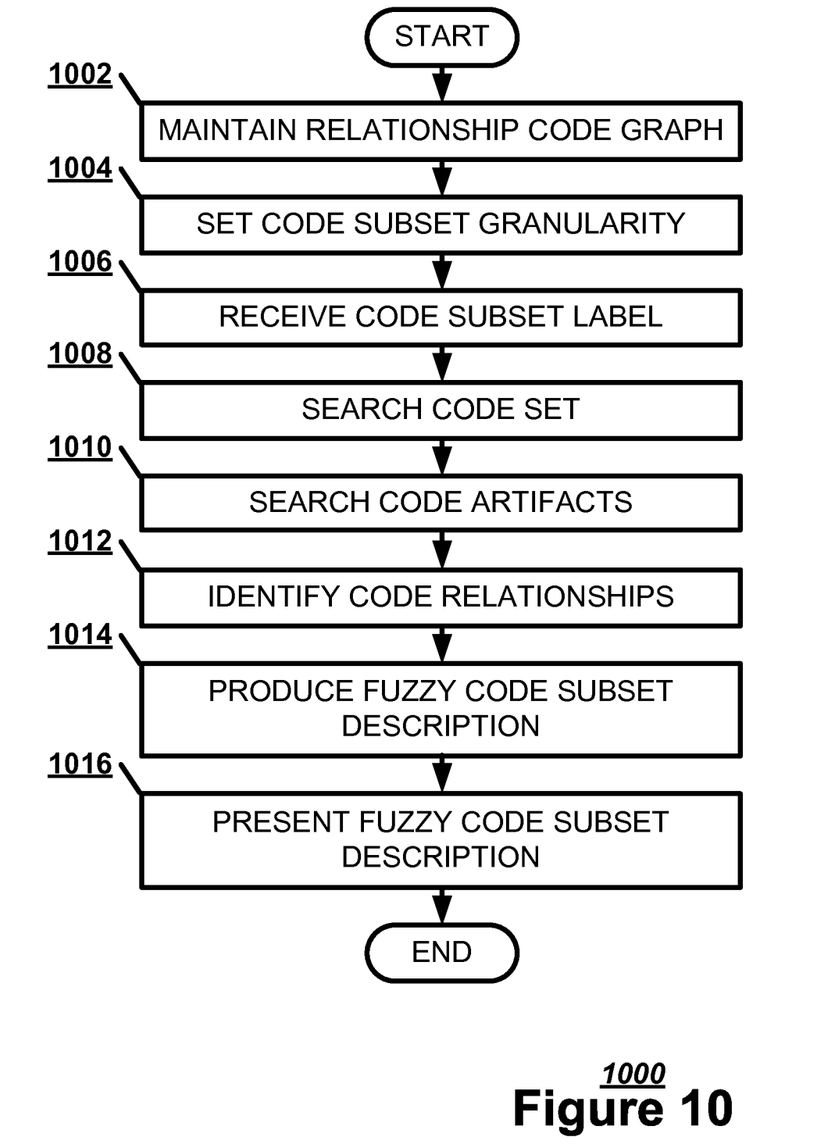
FIG. 10 illustrates, in a flowchart, one embodiment of a method for producing a fuzzy code subset description.

FIG. 10 illustrates, in a flowchart, one embodiment of a method 1000 for producing a fuzzy code subset description. The source code analytics platform may maintain a code relationship graph associating a source code set 410 with a descriptive metadata set (Block 1002). The source code analytics platform may set a code subset granularity for a code subset search of the source code set 410 (Block 1004). The source code analytics platform may receive a code subset label 610 (Block 1006). The source code analytics platform may search the source code set based on the code subset label 610 (Block 1008). The source code analytics platform may search a set of code artifacts associated with the source code set 410 based on the code subset label 610 (Block 1010). The source code analytics platform may map the artifact search results to code graph nodes of the code relationship graph 514 to identify code relationships that may describe the code subset identified by the code subset label 610 (Block 1012). The source code analytics platform may produce a fuzzy code subset description 612 (Block 1014). The source code analytics platform may present a fuzzy code subset description 612 (Block 1016).

Although the subject matter has been described in language specific to structural features and/or methodological acts, the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
    applying an information retrieval module to a source code set and a code production data set associated with the source code set to retrieve a node artifact set for the source code set;
    executing a program analysis module to perform at least one of a code analysis of the source code set and a metadata analysis of the code production data set to refine the node artifact set;
    executing a machine learning module to correlate the node artifact set;
    creating a code relationship graph associating the source code set with a descriptive metadata set describing at least one representative element of the source code set;
    receiving a user natural language search entry;
    determining a user intent based on the user natural language search entry;
    searching the source code set based on the code relationship graph; and
    ranking a code result set based on the code relationship graph.

2. The method of claim 1, further comprising:
    setting a code subset granularity for a code subset search of the source code set.

3. The method of claim 1, further comprising:
    receiving a code subset change to a code subset of the source code set.

4. The method of claim 1, further comprising:
    identifying an impacted code subset of the source code set based on a code subset change.

5. The method of claim 1, further comprising:
    producing an impact analysis of a code subset change.

6. The method of claim 1, further comprising:
    receiving a code subset label; and
    producing a fuzzy code subset description.

7. The method of claim 1 wherein the node artifact set has at least one of a keyword, a variable name, a comment, a control flow edge, a data flow relation, a type inference, and a text analysis of code.

8. A tangible computer-readable medium having a set of instructions detailing a method stored thereon that when executed by one or more processors cause the one or more processors to perform the method, the method comprising:
    applying an information retrieval module to a source code set and a code production data set associated with the source code set to retrieve a node artifact set for the source code set;
    executing a program analysis module to perform at least one of a code analysis of a source code set and a metadata analysis of a code production data set to refine the node artifact set;
    executing a machine learning module to correlate the node artifact set;
    creating a code relationship graph associating the source code set with a descriptive metadata set describing at least one representative element of the source code set;
    receiving a user natural language search entry;
    searching the source code set based on the code relationship graph; and
    ranking a code result set based on the code relationship graph.

9. The tangible computer-readable medium of claim 8, wherein the method further comprises:

creating the descriptive metadata subset associated with a described code subset based on at least one of a product description document, a design document, and a bug report.

10. The tangible computer-readable medium of claim 8, wherein the method further comprises:
applying at least one of a control flow analysis and a data flow analysis to a described code subset to identify a matching code subset.

11. The tangible computer-readable medium of claim 8, wherein the method further comprises:
applying an information retrieval technique to a described code subset.

12. The tangible computer-readable medium of claim 8, wherein the method further comprises:
identifying a mislabeled data variable based on a data flow analysis.

13. The tangible computer-readable medium of claim 8, wherein the method further comprises:
associating a matching code subset with the descriptive metadata subset describing a described code subset.

14. The tangible computer-readable medium of claim 8, wherein the method further comprises:
extracting the descriptive metadata subset from a described code subset.

15. A source code analytics platform, comprising:
a processor;
a database interface, using the processor, configured to access a code database storing a source code set and a data repository storing a code production data set associated with the source code set;
the processor configured to execute an information retrieval module to retrieve a node artifact set for the source code set from the source code set and the code production data set, a program analysis module to perform at least one of a code analysis of the source code set and a metadata analysis of the code production data set to refine the node artifact set, and a machine learning module to correlate the node artifact set to create a code relationship graph associating the source code set with a descriptive metadata describing at least one representative element of the source code set;
a data storage that maintains the code relationship graph;
a user input device configured to receive a user natural language search entry for executing a natural language search on the source code set using the code relationship graph; and
an output device configured to return a ranked code result set based on the code relationship graph.

16. The source code analytics platform of claim 15, wherein the processor is configured to set a code subset granularity for a code subset search of the source code set.

17. The source code analytics platform of claim 15, wherein the user input device is configured to receive a code subset label and the output device is configured to produce a fuzzy code subset description.

18. The source code analytics platform of claim 15, wherein the processor is configured to create the descriptive metadata subset associated with a described code subset based on at least one of a product description document, a design document, and a bug report.

19. The source code analytics platform of claim 15, wherein the processor is configured to extract the descriptive metadata subset from a described code subset.

20. The source code analytics platform of claim 15, wherein the processor is configured to associate a matching code subset with a descriptive metadata subset describing a described code subset.

* * * * *